Feb. 27, 1951   T. W. CLARK ET AL   2,542,969
STEAM TRAP
Filed July 5, 1946

INVENTORS
THEODORE W. CLARK
HENRY H. MALTBIE
By Hyde, Meyer, Baldwin & Doran
ATTORNEYS Patented Feb. 27, 1951

2,542,969

UNITED STATES PATENT OFFICE 2,542,969

STEAM TRAP

Theodore W. Clark, Corry, Pa., and Henry H. Maltbie, Geneva, Ohio, assignors, by mesne assignments, to Strong Steam Specialty Mfg. Co., Cleveland, Ohio, a corporation of Ohio Application July 5, 1946, Serial No. 681,581

5 Claims. (Cl. 236—53)

This invention relates to steam traps and more particularly, to steam traps of the type which include two separate and independent valve controlled discharge orifices, namely, (a) a discharge orifice from the main chamber of the trap and which is controlled by a valve operated by a float in such chamber, and (b) a discharge orifice in a passageway which by-passes said chamber and which is controlled by a thermostatically operated valve. As the thermally controlled by-pass orifice is open when the steam system in which the trap is mounted is below its normal operating temperatures, the provision in the trap of the by-pass orifice enables the trap to rapidly and directly free the system of air and the system thus more quickly put into normal operating condition. Thereafter, with the system operating at normal temperatures and with the thermally controlled by-pass valve automatically closed, the main float controlled valve functions to maintain the system free of condensate and air.

The present invention has for one of its objects the provision of a steam trap of this type in which the float controlled main valve and the thermally controlled by-pass valve are located in vertical alignment above and below a common outlet passageway but with the thermally controlled by-pass valve shielded and thereby protected from the heated condensate and air discharge by the main valve.

A more specific object of the present invention is the provision of a protecting shield or baffle for the thermally controlled by-pass valve.

A still more specific object of the present invention is the provision of a by-pass valve shield or baffle which is an integral part of the by-pass orifice member with which such valve cooperates, the shield or baffle thus being of exceedingly simple and inexpensive form but highly effective in its shielding function.

Figure 1:
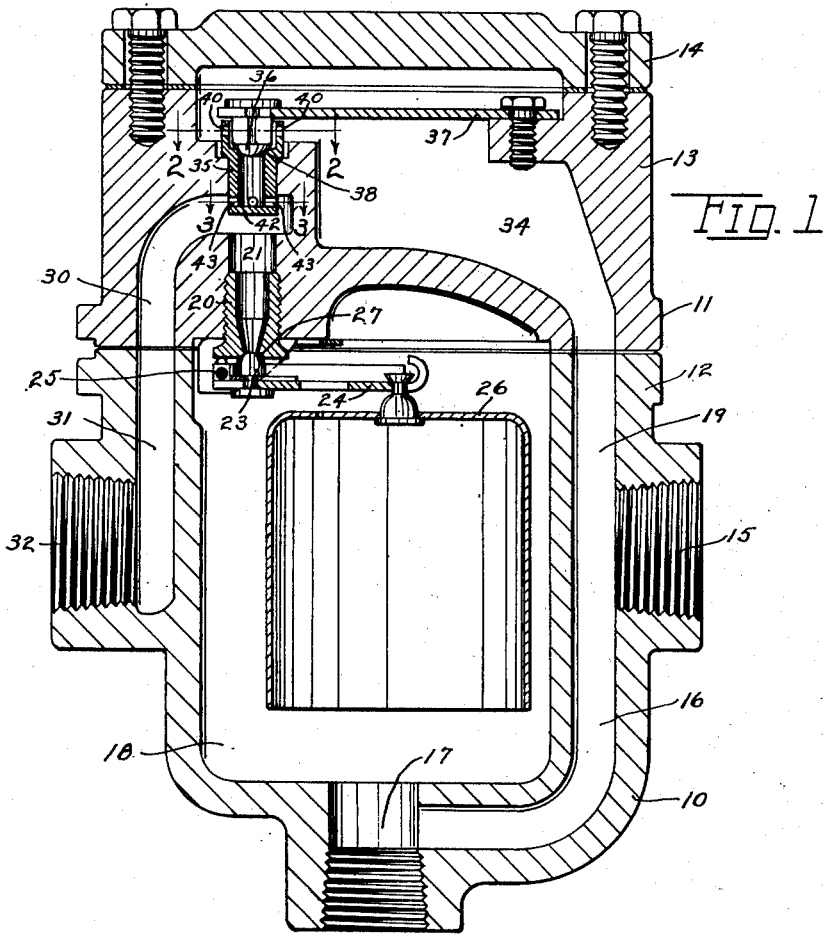
Figure 2:
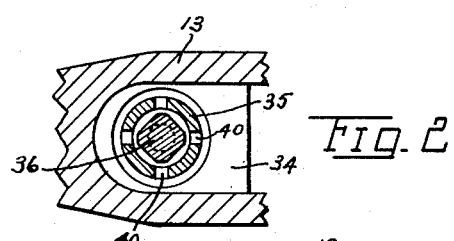
Figure 4:
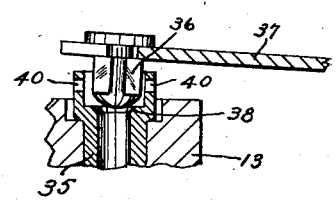
Figure 3:
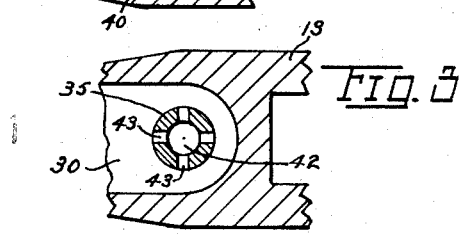

Other objects of the present invention, and certain of its practical advantages, will be referred to in or will be evident from the following description of one embodiment of the invention, as illustrated in the accompanying drawing, in which Fig. 1 is a vertical sectional view of a steam trap embodying the present invention, the trap as shown having both of its discharge orifices closed by their respective valves;

Figs. 2 and 3 are detail cross-sectional views of that portion of the trap which contains the thermally controlled by-pass valve, the views being respectively on the lines 2—2 and 3—3 of Fig. 1; and Fig. 4 is a fragmentary vertical sectional view, showing the thermally controlled by-pass valve in open position.

Before the steam trap here illustrated is specifically described, it is to be understood that the invention here involved is not limited to the structural details or the particular arrangement of parts here shown, as steam traps embodying the present invention may take other forms. It also is to be understood that the phraseology or terminology herein employed is for purposes of description and not of limitation, the scope of the present invention being denoted by the appended claims.

The steam trap here illustrated, for the disclosure of one embodiment of the present invention, comprises a cup-shaped casing 10 closed at its top by a cover member 11 bolted or otherwise suitably secured to a rim flange 12 with which the casing is provided. As here shown, the cover member 11 is provided with an upright integral extension 13 of elongated form, the open upper end of which is closed by a cap 14 bolted or otherwise suitably secured in place.

At one side thereof, the casing 10 is provided with an inlet port 15 for the connection of the trap in a steam system and for the delivery to the tray of steam, condensate and air from such system. As will be evident from Fig. 1, the casing 10 is provided with two branch passageways leading from the inlet port 15, one being a downwardly extending passageway 16 leading to a bottom inlet opening 17 of a float chamber 18, and the other being an upwardly extending passageway 19 which constitutes a section of a by-pass conduit to be hereinafter described. If desired, a drain opening, here shown as of threaded form, may be provided in the bottom of the casing 10, immediately below the inlet opening 17, the drain opening normally being closed by a threaded plug or equivalent means, as will be readily understood.

In the normal operation of the trap, with the associated steam system at a sufficient temperature to maintain in closed position the thermally controlled valve (hereinafter described) of the by-pass conduit, steam, condensate and air entering the trap through the inlet port 15 thereof travel downwardly through the branch passageway 16 to the float chamber 18. From this chamber, condensate and air are intermittently discharged through an orifice member 20 threaded or otherwise suitably secured in a vertically disposed opening 21 in the cover member 11 and its upright extension 13. For the control of the discharge orifice of member 20, a float operated valve 23 is provided, said valve being carried by a lever 24 having one of its ends pivoted at 25 to the casing 10 and from the other end of which is suspended a float in the form of an inverted bucket 26.

As will be readily understood, when sufficient steam or air is trapped in the inverted bucket 26, and there is a substantial amount of liquid condensate in the float chamber 18, the bucket floats and the valve 23 is thus held in orifice closing position up against its seat 27 on the lower end portion of the orifice member 29, an end portion which lies within the float chamber 18. When, however, the liquid condensate within the bucket 26 rises beyond a critical level, due to escape of air through the vent aperture 28 in the top wall of the bucket, the bucket falls, with consequent movement of the valve 23 from its seat 27 and the opening of the discharge orifice controlled by such valve. Thereupon, condensate and air are discharged from the float chamber 18 by the pressure of the steam therein, the valve 23 remaining open until the bucket 26 is again raised to floating position, as will be readily understood.

For the discharge of condensate and air expelled from the float chamber 18, in normal trap operation; and for the discharge of air flowing through the hereinafter described by-pass conduit, in initial trap operation, the trap is provided with an outlet passageway having an upper section 30 thereof in the cover member 11 and its upright extension 13 and having a lower section 31 thereof in the casing 10. The lower section of the outlet conduit leads to an outlet port 32 with which the casing 10 is provided and to which may be secured a suitable discharge conduit (not here shown).

The thermally controlled by-pass conduit, which circumvents the float chamber 18 and which effects, when open rapid and direct discharge of air from the steam system in which the trap is mounted, comprises the heretofore mentioned branch passageway 19 in the casing 10, which leads upwardly from the casing inlet port 15, and also a communicating passageway 34 in the cover member 11 and its upright extension 13. In the discharge end portion of the passageway 34 is frictionally retained or otherwise suitably mounted a discharge orifice member 35, which overlies the inlet end portion of the upper section 30 of the trap's outlet passageway and which is in vertical alignment with the discharge orifice member 29 for the float chamber 18.

As clearly shown in Figs. 1 and 4, the by-pass orifice member 35 is enlarged at its upper end to receive a valve 36 for controlling the flow of air through the orifice of such member. The valve 36 is thermally controlled and as here shown, is slidably mounted on the bifurcated free end portion of a thermostatic lever 37 having its other end portion bolted or otherwise rigidly secured to the cover member extension 13. Due to the construction of the valve lever 37 from superposed layers of materials having differing co-efficients of expansion, the flexure of said lever, in response to temperature changes, is such that the valve 36 carried thereby is raised from its seat 38 at the base of the enlarged upper end portion of the orifice member 35 only when the steam system in which the trap is mounted is below its normal operating temperatures, such as when the system is being put into operation or into normal operating condition. At such times, air in the system is rapidly evacuated through the trap's by-pass conduit, the air entering the now open by-pass discharge orifice member 35 through its upper end and through circumferentially disposed apertures 40 in the side wall of the enlarged upper end portion of such member. When the steam system in which the trap is mounted is brought to its normal operating temperatures, which is more quickly accomplished, of course, because of the rapid evacuation of air through the trap's by-pass conduit, the thermally controlled valve 36 of the by-pass conduit is automatically closed, and thereafter, the condensate and air discharge come under the sole control of the float operated valve 23 for the float chamber's discharge orifice.

Inasmuch as the by-pass orifice is in vertical alignment with the discharge orifice for the float chamber 18, the two orifices discharging into the outlet passageway therebetween, a baffle or shield is provided to protect the thermally controlled by-pass valve 36 from heated condensate and air discharged from the float chamber 18, as otherwise such valve might be undesirably opened or its operation otherwise undesirably affected.

As here shown, the shielding of the thermally controlled by-pass valve 36 is effected by providing the by-pass orifice member 35 with a bottom end closure 42 which may be, and here is, an integral part of said member. Above such end closure, in that portion of the orifice member which projects downwardly into the trap's outlet passageway, are provided one or more apertures 43 for lateral air discharge, there being four such apertures, in circumferentially spaced relation, in the present embodiment of the invention. The end closure shield or baffle 42 for the thermally controlled by-pass valve 36 is thus of simple and inexpensive form but one which is highly effective in its shielding function. The provision of such shield or baffle permits the two discharge orifices to be located in closely neighboring relation, for discharge into a common outlet passageway therebetween, but with full protection of the thermally controlled by-pass valve from the effects of discharges from the orifice of the float chamber.

To those skilled in the art to which the present invention relates, other features and advantages of steam traps embodying the invention will be evident from the foregoing description of one such embodiment.

Having described our invention, we claim:

1. A steam trap, comprising a casing having an inlet port, means providing two separate and independent passageways from said inlet port to an outlet conduit, the discharge ends of said passageways being in opposed relation and discharging toward each other into said outlet conduit, a discharge orifice member in the discharge end of one of said passageways, a thermally operated valve for controlling the orifice of said orifice member, valve means for controlling said other passageway, and a shield or baffle for the thermally operated valve to protect it from the effects of discharges from the other passageway, said shield or baffle being carried by said orifice member between said thermally operated valve and the discharge end of the other passageway.

2. A steam trap, comprising a casing having an inlet port, means providing two separate and independent passageways from said inlet port to an outlet conduit, the discharge ends of said passageways being in opposed relation and discharging toward each other into said outlet conduit, a discharge orifice member in the discharge end of one of said passageways, a thermally operated valve for controlling the orifice of said orifice member, valve means for controlling said other passageway, and a shield or baffle for the thermally operated valve to protect it from the effects of discharges from the other passageway, said shield or baffle being integral with said orifice member and being disposed between said thermally operated valve and the discharge end of the other passageway.

3. A steam trap, comprising a casing having an inlet port, means providing two separate and independent passageways from said inlet port to an outlet conduit, the discharge ends of said passageways being in opposed relation and discharging toward each other into said outlet conduit, a discharge orifice member in the discharge end of one of said passageways and having an end portion projecting into said outlet conduit, a thermally operated valve cooperating with said orifice member in spaced relation to its projecting end portion for controlling the orifice of such member, valve means for controlling the other passageway, and a shield or baffle carried by the projecting end portion of said orifice member to protect its thermally operated valve from the effects of discharges from the other passageway.

4. A steam trap, comprising a casing having an inlet port, means providing two separate and independent passageways from said inlet port to an outlet conduit, the discharge ends of said passageways being in opposed relation and discharging toward each other into said outlet conduit, a discharge orifice member of tubular sleeve form in the discharge end of one of said passageways and having an end portion projecting into said outlet conduit, a thermally operated valve cooperating with said orifice member in spaced relation to its projecting end portion for controlling the orifice of such member, valve means for controlling the other passageway, and a side aperture in the projecting end portion of said orifice member for lateral discharge into said outlet conduit, the end of said projecting end portion of said orifice member being closed to provide a shield or baffle to protect the thermally operated valve from the effect of discharges from the other passageway.

5. A steam trap, comprising a casing having an inlet port, means providing two separate and independent passageways from said inlet port to an outlet conduit, the discharge ends of said passageways being in opposed relation and discharging toward each other into said outlet conduit, a discharge orifice member of one-piece tubular sleeve form in the discharge end of one of said passageways and having an end portion projecting into said outlet conduit, a thermally operated valve cooperating with said orifice member in spaced relation to its projecting end portion for controlling the orifice of such member, valve means for controlling the other passageway, and a side aperture in the projecting end portion of said orifice member for lateral discharge into said outlet conduit, the end of said projecting end portion of said orifice member being closed to provide a shield or baffle integral with said orifice member to protect the thermally operated valve from the effect of discharges from the other passageway.

THEODORE W. CLARK.
HENRY H. MALTBIE.

REFERENCES CITED

The following references are of record in the file of this patent:

UNITED STATES PATENTS

| Number | Name | Date |
| --- | --- | --- |
| 986,967 | Dunham | Mar. 14, 1911 |
| 2,174,485 | Zies | Sept. 26, 1939 |

FOREIGN PATENTS

| Number | Country | Date |
| --- | --- | --- |
| 225,926 | Germany | Sept. 22, 1910 |